US010021098B2

(12) United States Patent
Cai et al.

(10) Patent No.: US 10,021,098 B2
(45) Date of Patent: Jul. 10, 2018

(54) ACCOUNT LOGIN METHOD, DEVICE, AND SYSTEM

(71) Applicant: Huawei Technologies Co., Ltd., Shenzhen (CN)

(72) Inventors: Tao Cai, Shenzhen (CN); Li Li, Bridgewater, NJ (US); Wu Chou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 14/978,994

(22) Filed: Dec. 22, 2015

(65) Prior Publication Data

US 2016/0112419 A1    Apr. 21, 2016

Related U.S. Application Data

(63) Continuation of application No. PCT/CN2014/079702, filed on Jun. 12, 2014.

(30) Foreign Application Priority Data

Jun. 25, 2013  (CN) .......................... 2013 1 0256031

(51) Int. Cl.
*H04L 29/06* (2006.01)
*H04L 9/32* (2006.01)
*H04L 29/08* (2006.01)

(52) U.S. Cl.
CPC ............ *H04L 63/0876* (2013.01); *H04L 9/32* (2013.01); *H04L 63/0815* (2013.01);
(Continued)

(58) Field of Classification Search
CPC ............ H04L 63/0815; H04L 63/0876; H04L 63/0884; G06F 21/335
See application file for complete search history.

(56) References Cited

U.S. PATENT DOCUMENTS 7,747,856 B2   6/2010  Favazza et al.
7,941,544 B2   5/2011  Hayer et al.
(Continued)

FOREIGN PATENT DOCUMENTS

CN    102638473 A    8/2012
CN    102821085 A    12/2012
(Continued)

OTHER PUBLICATIONS

Foreign Communication From a Counterpart Application, PCT Application No. PCT/CN2014/079702, English Translation of International Search Report dated Sep. 4, 2014, 2 pages.
(Continued)

*Primary Examiner* — David J Pearson
(74) *Attorney, Agent, or Firm* — Conley Rose, P.C.

(57) ABSTRACT

An account login method detects whether an account login request carries an indicator for keeping a logged-in state to determine whether a user decides to keep a logged-in state, and authentication information allocated by an integrated data services platform is stored when it is determined that a logged-in state on a third-party application or website needs to be kept; therefore, in a subsequent login process, the third-party application or website may use the authentication information to automatically perform authentication login to the integrated data services platform.

18 Claims, 11 Drawing Sheets

(52) U.S. Cl.
CPC ........ *H04L 63/0884* (2013.01); *H04L 63/102*
(2013.01); *H04L 67/146* (2013.01)

(56) References Cited

U.S. PATENT DOCUMENTS

| | | |
|---|---|---|
| 8,256,664 B1 | 9/2012 | Balfanz et al. |
| 2003/0110266 A1 | 6/2003 | Rollins et al. |
| 2004/0139319 A1 | 7/2004 | Favazza et al. |
| 2007/0162963 A1* | 7/2007 | Penet ................ G06F 21/41 726/5 |
| 2010/0017596 A1 | 1/2010 | Schertzinger |
| 2010/0071046 A1 | 3/2010 | Seethana et al. |
| 2010/0082826 A1 | 4/2010 | Hu et al. |
| 2010/0100952 A1* | 4/2010 | Sample ............... H04L 51/066 726/9 |
| 2011/0030041 A1 | 2/2011 | Favazza et al. |
| 2013/0086670 A1* | 4/2013 | Vangpat ............. H04L 9/3213 726/8 |
| 2013/0104202 A1* | 4/2013 | Yin .................... G06F 21/42 726/5 |
| 2014/0096205 A1 | 4/2014 | Zhuang et al. |
| 2014/0136704 A1 | 5/2014 | Yang et al. |

FOREIGN PATENT DOCUMENTS

| | | |
|---|---|---|
| CN | 102857484 A | 1/2013 |
| CN | 102916933 A | 2/2013 |
| CN | 103036851 A | 4/2013 |
| CN | 103051647 A | 4/2013 |
| CN | 103067381 A | 4/2013 |
| JP | 2004062876 A | 2/2004 |
| JP | 2006031064 A | 2/2006 |
| JP | 2011258000 A | 12/2011 |

OTHER PUBLICATIONS

Foreign Communication From a Counterpart Application, PCT Application No. PCT/CN2014/079702, English Translation of Written Opinion dated Sep. 4, 2014, 11 pages.
Machine Translation and Abstract of Chinese Publication No. CN2006031064, Feb. 2, 2006, 26 pages.
Machine Translation and Abstract of Chinese Publication No. CN103067381, Apr. 24, 2013, 21 pages.
Foreign Communication From a Counterpart Application, Japanese Application No. 2016-522211, Japanese Office Action, dated Apr. 18, 2017, 4 pages.
Foreign Communication From a Counterpart Application, Japanese Application No. 2016-522211, English Translation of Japanese Office Action, dated Apr. 18, 2017, 4 pages.
Foreign Communication From a Counterpart Application, Chinese Application No. 201310256031.9, Chinese Office Action dated Mar. 1, 2017, 5 pages.
"Information about the Liberty Alliance Project," Technical Specification Group Services and System Aspects, Meeting #18, TSGS#18(02)0815, Dec. 9-12, 2002, 48 pages.
Foreign Communication From a Counterpart Application, European Application No. 14817243.0, Extended European Search Report dated May 6, 2016, 7 pages.

\* cited by examiner

ACCOUNT LOGIN METHOD, DEVICE, AND SYSTEM

CROSS-REFERENCE TO RELATED APPLICATIONS

This application is a continuation of International Application No. PCT/CN2014/079702, filed on Jun. 12, 2014, which claims priority to Chinese Patent Application No. 201310256031.9, filed on Jun. 25, 2013, both of which are hereby incorporated by reference in their entireties.

TECHNICAL FIELD

The present disclosure relates to the field of data processing, and in particular, to an account login method, device, and system.

BACKGROUND

"Direct login, without registration, by using an account of another integrated data services platform" almost has become a basic function of most websites at present. This function enables a medium-/small-sized website to interconnect its own product and service to a large-sized platform website, which not only omits tedious work such as registration on the medium-/small-sized website, without a need to store and transmit a great amount of user account information, but also rapidly increases access traffic and user resources, better promoting the service of the medium-/small-sized website. Furthermore, the large-sized platform website can access many applications provided by the medium-/small-sized website by using only an (Application Protocol Interface (API)) supported protocol, thereby providing more and better services for a user. This is a win-win situation for a developer and a platform provider. Therefore, a an instant messaging tool login such as QQ login and Weibo login, and a social networking service (SNS) login almost become essential login manners of a third-party website or application.

In this process of logging in to a medium-/small-sized website by using an account of a large-sized integrated data services platform, each time a user logs in to the medium-/small-sized website, the user generally needs to be redirected to a login interface of the large-sized integrated data services platform for a login, and the user may be redirected back to a service of the medium-/small-sized website to perform an operation only after the login is successful. This operation is relatively complex and brings poor experience to the user; therefore, the medium-/small-sized website generally keeps a logged-in state of the user by default after the user has logged in for one time, so that the user may keep a logged-in state and does not need to log in for multiple times each time the user uses the service of the same medium-/small-sized website.

In a process of implementing the foregoing account login, the prior art has at least the following problem: if a user logs in from a computer at a public place such as an internet cafe and an airport in the foregoing login manner, to use a service of a medium-/small-sized website, but the user forgets to log out, the medium-/small-sized website does not actively make an account of the user exit, but keeps a logged-in state of the user; therefore, an account identity is prone to be used fraudulently by another user, thereby causing security problem.

SUMMARY

Embodiments of the present disclosure provide an account login method, device, and system, which may increase account login security.

The embodiments of the present disclosure use the following technical solutions:

According to a first aspect, an embodiment of the present disclosure provides an account login method, including: receiving an account login request sent by a first terminal device operated by a user, and sending the account login request to an integrated data services platform, where the account login request is used to instruct to use an account authentication process of the integrated data services platform; and detecting whether the account login request carries an indicator of keeping a logged-in state; acquiring and storing authentication information of the first terminal device when it is detected that the account login request carries the indicator of keeping a logged-in state, where the authentication information is authentication information allocated to the first terminal device by the integrated data services platform according to an account login identifier of the user, and the account login identifier is acquired by the integrated data services platform according to the account login request; allocating a first access identifier to the first terminal device, and sending the first access identifier to the first terminal device, so that the first access identifier is carried in a service access request sent by the first terminal device; and establishing and storing a correspondence between the first access identifier allocated to the first terminal device and the authentication information allocated by the integrated data services platform to the first terminal device, so as to keep a logged-in state of the user on the first terminal device, and complete an account login operation of the user on the first terminal device.

With reference to the first aspect, in a first possible implementation manner, the method further includes: receiving the service access request sent by the first terminal device operated by the user, where the service access request carries the first access identifier allocated to the first terminal device; searching, according to the first access identifier, for the stored authentication information corresponding to the first access identifier; sending the stored authentication information to the integrated data services platform when the stored authentication information corresponding to the first access identifier is found, so that the integrated data services platform determines whether the authentication information is valid; and configuring service access information for the user when a message indicating that the integrated data services platform determines that the authentication information is valid is received.

With reference to the first aspect or the first possible implementation manner of the first aspect, in a second possible implementation manner, the method further includes: receiving an account logout request sent by the first terminal device operated by the user, where the account logout request carries the first access identifier allocated to the first terminal device; determining, according to the first access identifier, the stored authentication information corresponding to the access identifier; and deleting the determined authentication information, so as to complete an account logout operation of the user on the first terminal device.

With reference to the first aspect, in a third possible implementation manner, after account login configuration is performed for the user, the method further includes: acquiring user information of the user, where the user information is in a one-to-one correspondence with the user; and establishing and storing a correspondence between the first access identifier allocated to the first terminal device and the user information.

With reference to the first aspect, in a fourth possible implementation manner, after account login configuration is performed for the user, the method further includes: acquiring user information of the user, where the user information is in a one-to-one correspondence with the user; and establishing and storing a correspondence among the first access identifier allocated to the first terminal device, the authentication information corresponding to the first access identifier, and the user information.

With reference to the third possible implementation manner of the first aspect, in a fifth possible implementation manner, the method further includes: receiving an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device; according to the second access identifier and a stored correspondence between an access identifier and the user information, determining the user information corresponding to the second access identifier, and determining an access identifier corresponding to the user information, where the access identifier corresponding to the user information includes the second access identifier, and an access identifier allocated to another device when the user logs in for a first time by using the other device other than the second terminal device; determining, according to the determined access identifier corresponding to the user information and a stored correspondence between the access identifier and authentication information, the authentication information corresponding to the access identifier; and deleting the determined authentication information, so as to complete an account logout operation of the user on the second terminal device and on the other device.

With reference to the fourth possible implementation manner of the first aspect, in a sixth possible implementation manner, the method further includes: receiving an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device; determining, according to the second access identifier and a stored correspondence among an access identifier, authentication information, and the user information, authentication information corresponding to the user information corresponding to the second access identifier; and deleting the determined authentication information, so as to complete an account logout operation of the user on the second terminal device and on another device.

With reference to the first possible implementation manner of the first aspect, in a seventh possible implementation manner, the method further includes: forwarding a re-login request to the integrated data services platform when the stored authentication information corresponding to the first access identifier is not found, so that the integrated data services platform acquires the account login identifier of the user according to the account login request, and allocates authentication information to the first terminal device according to the account login identifier; and performing account login configuration for the user after the authentication information is acquired.

According to a second aspect, an embodiment of the present disclosure provides an account login method, where the method includes: sending an account login request of a user to a third-party server, where the account login request is used to instruct to use an account authentication process of an integrated data services platform, and the account login request carries an indicator of keeping a logged-in state; receiving authentication information sent by the integrated data services platform, where the authentication information is authentication information allocated by the integrated data services platform according to an account login identifier of the user, and the account login identifier is acquired by the integrated data services platform according to the account login request forwarded by the third-party server; sending the authentication information to the third-party server, so that the third-party server acquires and stores the authentication information according to the indicator of keeping a logged-in state in the account login request; and receiving and storing an access identifier sent by the third-party server, so as to implement an account login operation of the user, where the access identifier is used to be carried when a service access request is sent.

According to a third aspect, an embodiment of the present disclosure provides an account login apparatus, where the method includes: a receiving unit, configured to receive an account login request sent by a first terminal device operated by a user, and send the account login request to an integrated data services platform, where the account login request is used to instruct to use an account authentication process of the integrated data services platform; a detecting unit, configured to detect whether the account login request received by the receiving unit carries an indicator of keeping a logged-in state; an acquiring unit, configured to acquire and store authentication information of the first terminal device when the detecting unit detects that the account login request carries the indicator of keeping a logged-in state, where the authentication information is authentication information allocated to the first terminal device by the integrated data services platform according to an account login identifier of the user, and the account login identifier is acquired by the integrated data services platform according to the account login request; an allocating unit, configured to allocate a first access identifier to the first terminal device; a sending unit, configured to send, to the first terminal device, the first access identifier allocated by the allocating unit, so that the first access identifier is carried in a service access request sent by the first terminal device; and an information maintaining unit, configured to establish and store a correspondence between the first access identifier allocated by the allocating unit to the first terminal device and the authentication information allocated by the integrated data services platform to the first terminal device, so as to keep a logged-in state of the user on the first terminal device, and complete an account login operation of the user on the first terminal device.

With reference to the third aspect, in a first possible implementation manner, the device further includes a searching unit, where the receiving unit is further configured to receive the service access request sent by the first terminal device operated by the user, where the service access request carries the first access identifier allocated to the first terminal device; the searching unit is configured to search, according to the first access identifier received by the receiving unit, for the stored authentication information corresponding to the first access identifier; the sending unit is further configured to send the stored authentication information to the integrated data services platform when the searching unit finds the stored authentication information corresponding to the first access identifier, so that the integrated data services platform determines whether the authentication information is valid; and the information maintaining unit is further configured to configure service access information for the user when a message indicating that the integrated data services platform determines that the authentication information is valid is received.

With reference to the third aspect or the first possible implementation manner of the third aspect, in a second possible implementation manner, the device further includes a first determining unit, where the receiving unit is further configured to receive an account logout request sent by the first terminal device operated by the user, where the account logout request carries the first access identifier allocated to the first terminal device; the first determining unit is configured to determine, according to the first access identifier received by the receiving unit, the stored authentication information corresponding to the access identifier; and the information maintaining unit is further configured to delete the authentication information determined by the first determining unit, so as to complete an account logout operation of the user on the first terminal device.

With reference to the third aspect, in a third possible implementation manner, the acquiring unit is further configured to acquire user information of the user, where the user information is in a one-to-one correspondence with the user; and the information maintaining unit is further configured to establish and store a correspondence between the first access identifier allocated to the first terminal device and the user information.

With reference to the third aspect, in a fourth possible implementation manner, the acquiring unit is further configured to acquire user information of the user, where the user information is in a one-to-one correspondence with the user; and the information maintaining unit is configured to establish and store a correspondence among the first access identifier allocated to the first terminal device, the authentication information corresponding to the first access identifier, and the user information acquired by the acquiring unit.

With reference to the third possible implementation manner of the third aspect, in a fifth possible implementation manner, the device further includes a second determining unit, where the receiving unit is further configured to receive an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device; the second determining unit is configured to: according to the second access identifier and a stored correspondence between an access identifier and the user information, determine the user information corresponding to the second access identifier, and determine an access identifier corresponding to the user information, where the access identifier corresponding to the user information includes the second access identifier, and an access identifier allocated to another device when the user logs in for a first time by using the other device other than the second terminal device; and determine, according to the determined access identifier corresponding to the user information and a stored correspondence between the access identifier and authentication information, the authentication information corresponding to the access identifier; and the information maintaining unit is further configured to delete the authentication information determined by the second determining unit, so as to complete an account logout operation of the user on the second terminal device and on the other device.

With reference to the fourth possible implementation manner of the third aspect, in a sixth possible implementation manner, the device further includes a third determining unit, where the receiving unit is configured to receive an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device; the third determining unit is configured to determine, according to the second access identifier received by the receiving unit and a stored correspondence among an access identifier, authentication information, and the user information, authentication information corresponding to the user information corresponding to the second access identifier; and the information maintaining unit is configured to delete the authentication information determined by the third determining unit, so as to complete an account logout operation of the user on the second terminal device and on another device.

With reference to the first possible implementation manner of the third aspect, in a seventh possible implementation manner, the sending unit is further configured to forward a re-login request to the integrated data services platform when the searching unit does not find the stored authentication information corresponding to the access identifier, so that the integrated data services platform acquires the account login identifier of the user according to the re-login request, and allocates authentication information to the first terminal device according to the account login identifier; and the information maintaining unit is further configured to perform account login configuration for the user.

According to a fourth aspect, an embodiment of the present disclosure provides an account login device, where the device includes: a sending unit, configured to send an account login request of a user to a third-party server, where the account login request is used to instruct to use an account authentication process of an integrated data services platform, and the account login request carries an indicator of keeping a logged-in state; a receiving unit, configured to receive authentication information sent by the integrated data services platform, where the authentication information is authentication information allocated by the integrated data services platform according to an account login identifier of the user, and the account login identifier is acquired by the integrated data services platform according to the account login request forwarded by the third-party server, where the sending unit is further configured to send, to the third-party server, the authentication information received by the receiving unit, so that the third-party server acquires and stores the authentication information according to the indicator of keeping a logged-in state in the account login request; and the receiving unit is further configured to receive an access identifier sent by the third-party server; and a storage unit, configured to store the access identifier that is sent by the third-party server and that is received by the receiving unit, so as to implement an account login operation of the user, where the access identifier is used to be carried when a service access request is sent.

According to a fifth aspect, an embodiment of the present disclosure provides an account login system, where the system includes a user equipment, a third-party server, and an integrated data services platform server, where the user equipment is configured to send an account login request of a user to the third-party server, where the account login request instructs to use an account authentication process of the integrated data services platform; the third-party server is configured to receive the account login request sent by the user equipment, and send the account login request to the integrated data services platform, where the account login request is used to instruct to use the account authentication process of the integrated data services platform; detect whether the account login request carries an indicator of keeping a logged-in state; when it is detected that the account login request carries the indicator of keeping a logged-in state, acquire and store authentication information of the user equipment, where the authentication information is authentication information allocated to the user equipment by the integrated data services platform according to an account login identifier of the user, and the account login identifier is acquired by the integrated data services platform according to the account login request; allocate a first access identifier to the user equipment, and send the first access identifier to the user equipment, so that the first access identifier is carried in a service access request sent by the user equipment; and establish and store a correspondence between the first access identifier allocated to the user equipment and the authentication information allocated by the integrated data services platform to the user equipment, so as to keep a logged-in state of the user on the user equipment, and complete an account login operation of the user on the user equipment; the integrated data services platform server is configured to receive the account login request forwarded by the third-party server; acquire the account login identifier of the user according to the account login request; allocate the authentication information to the user according to the account login identifier; and send the authentication information to the user equipment.

It can be seen that, according to the account login method, device, and system provided by the embodiments of the present disclosure, whether a user decides to keep a logged-in state is determined by detecting whether an account login request of the user carries an indicator of keeping a logged-in state, where the account login request is used to instruct to use an account authentication process of an integrated data services platform; authentication information allocated by the integrated data services platform to the user is stored when the user determines that a logged-in state on a third-party application or website needs to be kept; therefore, in a subsequent login process of the user, the third-party application or website may use the authentication information of the user to automatically initiate an authentication request to the integrated data services platform for the user to log in to the third-party application or website. Compared with the prior art in which a logged-in state of a user is directly kept without inquiring the user, a possibility that an account identity of the user is fraudulently used can be effectively reduced, thereby improving user account login security.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
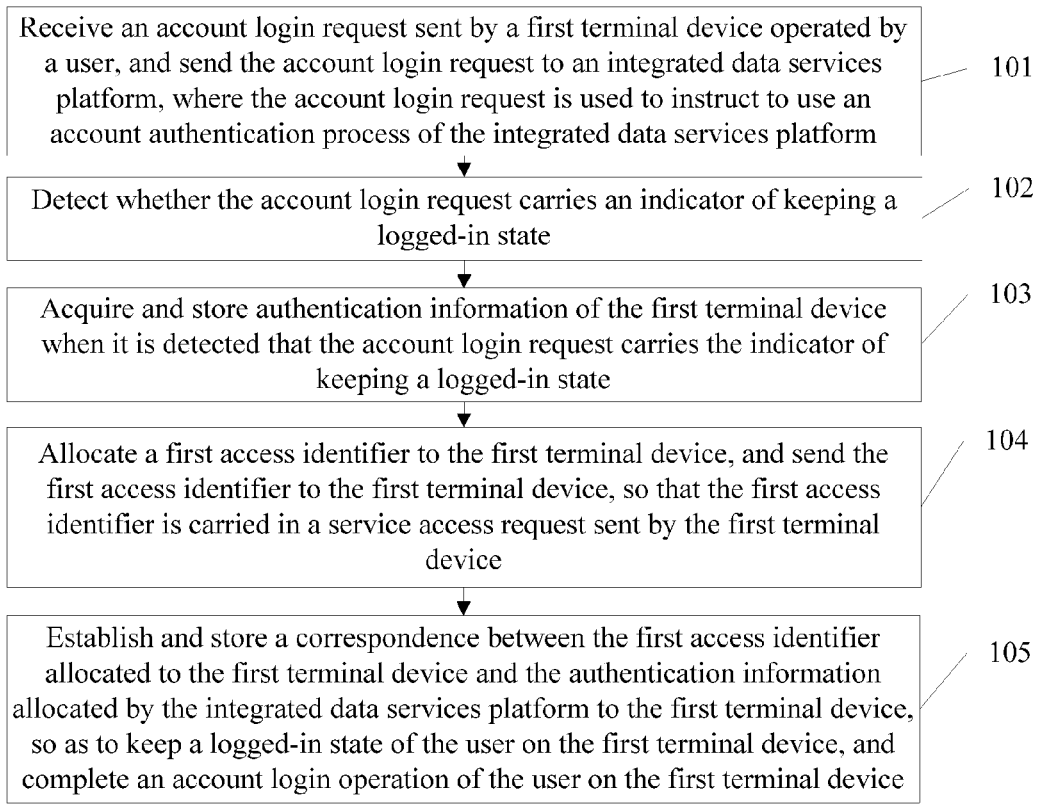
FIG. 1 is a flowchart of an account login method according to an embodiment of the present disclosure.

An embodiment of the present disclosure provides an account login method, which is mainly applied to an application scenario in which a user logs in to a third-party application or website by using an integrated data services platform account (such as a QQ account, a Weibo account, or an SNS account), and is implemented by the third-party application or website. As shown in FIG. 1, the method includes:

Step 101: Receive an account login request sent by a first terminal device operated by a user, and send the account login request to an integrated data services platform, where the account login request is used to instruct to use an account authentication process of the integrated data services platform.

It should be noted that each third-party application or website involved in this embodiment of the present disclosure generally provides the terminal device operated by the user with both an independent authentication process based on the third-party application or website and an authentication process in which the integrated data services platform is used; the account login request, sent by the terminal device operated by the user, described herein refers to an account login request that instructs to use the authentication process of the integrated data services platform. For example, in a login interface of a website, a user name and a password registered on the website is not directly input, but a "login by using QQ" function is selected.

Step 102: Detect whether the account login request carries an indicator of keeping a logged-in state.

The indicator of keeping a logged-in state is used to instruct to keep a current logged-in state of the user on the terminal device, so that the user may log in without a need to input a user name and/or a password when logging in again by using the terminal device. For example, the indicator of keeping a logged-in state may be implemented as a flag bit in the account login request. The indicator of keeping a logged-in state is generally triggered to be generated when the user selects an option such as "remember a logged-in state", "log in automatically next time", and "remember me", and the indicator of keeping a logged-in state is carried in the foregoing account login request.

In this embodiment of the present disclosure, the third-party application or website may provide, near a login indication button of the integrated data services platform in the login interface, the user with an option function button such as "remember a logged-in state", "log in automatically next time", and "remember me". For example, the user also clicks a "remember me" button when clicking "log in by using QQ".

Step 103: Acquire and store authentication information of the first terminal device when it is detected that the account login request carries the indicator of keeping a logged-in state.

The authentication information is authentication information allocated to the first terminal device by the integrated data services platform according to an account login identifier of the user, and the account login identifier is acquired by the integrated data services platform according to the account login request.

The account login identifier may be a user name and a password. The user uses, at the integrated data services platform, an authentication manner such as the user name and the password to determine an identity, and the integrated data services platform allocates corresponding authentication information to the user and delivers the authentication information to the user. Then, the user sends the authentication information to the third-party application or website to indicate that the user is successfully authenticated at the integrated data services platform. In this case, the third-party application or website may store the received authentication information of the user.

It should be noted that for more convenient authentication information management, the third-party application or website provided in this embodiment of the present disclosure selects to store the authentication information of the user in a session.

It should be additionally noted that when it is not detected that the account login request carries the indicator of keeping a logged-in state, the authentication information of the user is acquired only for determining identity information such as the user name and user permission, but is not stored, and all user information is deleted after a current login of the user ends.

Step 104: Allocate a first access identifier to the first terminal device, and send the first access identifier to the first terminal device, so that the first access identifier is carried in a service access request sent by the first terminal device.

If the foregoing authentication information is stored by using a session, the access identifier may be set according to a session identifier (ID) generating method in the prior art; if another storage manner is used, a corresponding identification manner may be set accordingly.

In addition, it should be noted that when the user logs in to the same third-party application or website by using different user equipment (such as a mobile phone and a computer), the third-party application or website allocates different access identifiers each time the user logs in.

It should be additionally noted that the service access request described herein is different from the foregoing account login request, and is generally used to start a service function on a page, such as picture browsing and message reply.

Step 105: Establish and store a correspondence between the first access identifier allocated to the first terminal device and the authentication information allocated by the integrated data services platform to the first terminal device, so as to keep a logged-in state of the user on the first terminal device, and complete an account login operation of the user on the first terminal device.

The correspondence between the first access identifier allocated to the first terminal device and the authentication information allocated by the integrated data services platform to the first terminal device refers to a correspondence between a session id and a session, or a correspondence between another storage manner and a corresponding identification manner, so as to keep the logged-in state of the user.

A method process of keeping the logged-in state of the user on the first terminal device, and completing the account login operation of the user on the first terminal device is performing account login configuration for the user, such as preparing and displaying some basic information of the user on the third-party website or application and configuration of a login home page. The user may store the access identifier in a corresponding cookie, or may store the access identifier in a corresponding uniform resource locator (URL) parameter that accesses the third-party application or service, or may store the access identifier in local storage of hypertext markup language (HTML) 5 for ease of use when logging in again.

It can be seen that, according to the account login method provided in this embodiment of the present disclosure, whether a user decides to keep a logged-in state is determined by detecting whether an account login request of the user carries an indicator of keeping a logged-in state, and authentication information allocated by an integrated data services platform to the user is stored when the user determines that a logged-in state on a third-party application or website needs to be kept; therefore, in a subsequent login process of the user, the third-party application or website may use the authentication information of the user to automatically initiate an authentication request to the integrated data services platform for the user to log in to the third-party application or website. Compared with the prior art in which a logged-in state of a user is directly kept without inquiring the user, a possibility that an account identity of the user is fraudulently used can be effectively reduced, and user account login security is improved.

Figure 2:
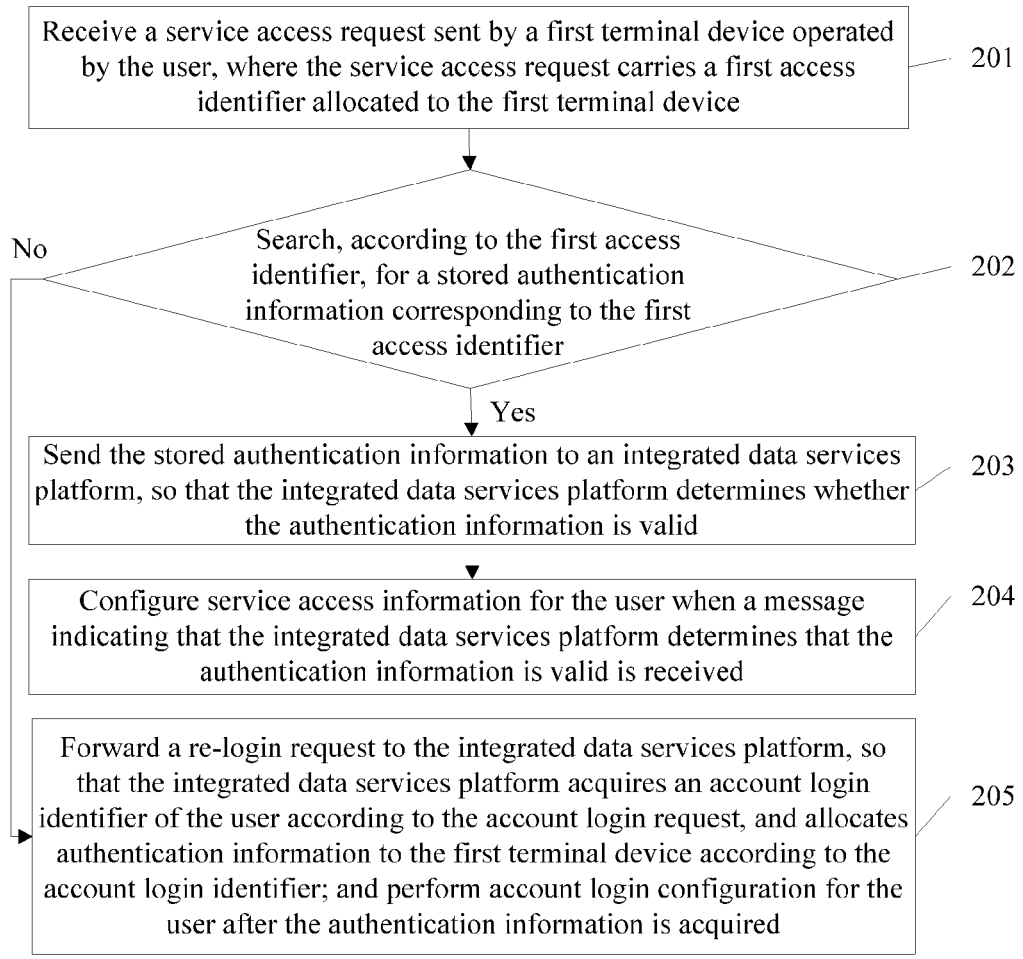
FIG. 2 is a flowchart of another account login method according to an embodiment of the present disclosure.

Further, to ensure that re-login to the third-party application or website is automatically completed after the user requests to keep the logged-in state, an embodiment of the present disclosure provides a method process shown in FIG. 2, where the method includes:

Step 201: Receive the service access request sent by the first terminal device operated by the user, where the service access request carries the first access identifier allocated to the first terminal device.

It should be noted that the user obtains the access identifier when logging in for a first time, and therefore the access identifier can be sent only when the user does not log in for the first time.

Step 202: Search, according to the first access identifier, for the stored authentication information corresponding to the first access identifier. When the stored authentication information corresponding to the first access identifier is found, step 203 is executed; otherwise, step 205 is executed.

Step 203: Send the stored authentication information to the integrated data services platform, so that the integrated data services platform determines whether the authentication information is valid.

The integrated data services platform is the integrated data services platform that allocates the authentication information to the user when the user logs in for the first time.

Step 204: Configure service access information for the user when a message indicating that the integrated data services platform determines that the authentication information is valid is received.

The configuring service access information described herein includes acquiring account login configuration information and starting a service function that is requested by the user to be started in the service access request.

Step 205: Forward a re-login request to the integrated data services platform, so that the integrated data services platform acquires an account login identifier of the user according to the account login request, and allocates authentication information to the first terminal device according to the account login identifier; and perform account login configuration for the user after the authentication information is acquired.

It can be seen that, in this embodiment of the present disclosure, a third-party application or website searches for authentication information of a user by using an access identifier previously allocated to the user. If the authentication information is found, it may be determined that the user has requested to record a logged-in state, and therefore the third-party application or website may directly use the found authentication information to identify authentication in an integrated data services platform, namely, the third-party application or website performs an identity authentication process instead of the user, thereby implementing automatic login, and shortening a process that the user logs in the third-party application or website by using an integrated data services platform account.

In addition, in a case in which it is determined that the user logs in for the first time or the authentication information is invalid, the user may be immediately allowed to participate in an account login process again, so as to ensure timeliness of user login.

Figure 3:
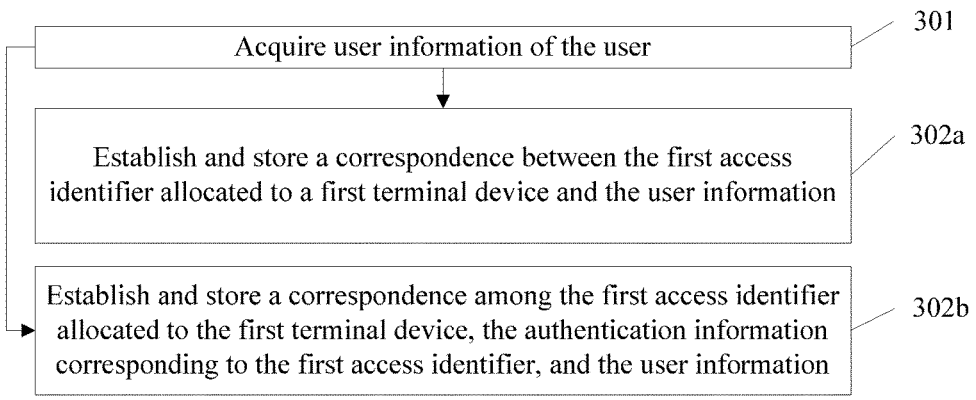
FIG. 3 is a flowchart of another account login method according to an embodiment of the present disclosure.

Further, for ease of management on logged-in states of a user account on different devices, an embodiment of the present disclosure provides a method process shown in FIG. 3, where the method process may be executed after step 105 and includes:

Step 301: Acquire user information of the user, and execute step 302a or step 302b.

The user information is in a one-to-one correspondence with the user. The user information may include information such as a user identity identifier (such as a user name or an identity number) or user permission.

Step 302a: Establish and store a correspondence between the first access identifier allocated to the first terminal device and the user information.

Step 302b: Establish and store a correspondence among the first access identifier allocated to the first terminal device, the authentication information corresponding to the first access identifier, and the user information.

In this embodiment of the present disclosure, a correspondence between user information that uniquely identifies a user and an access identifier is established, so that the access identifier is also in a correspondence with authentication information. The two correspondences may be stored together, for example, a table is used to store a tripartite correspondence; or may be separately stored in different tables. Unified storage is convenient for management and search by a third-party application or website, and provides system operating efficiency.

Further, after the correspondences among the user information, the access identifier, and the authentication information are unified, the third-party application or website may search, according to any of the three items, for information of the other two items, which provides searching efficiency.

Figure 4:
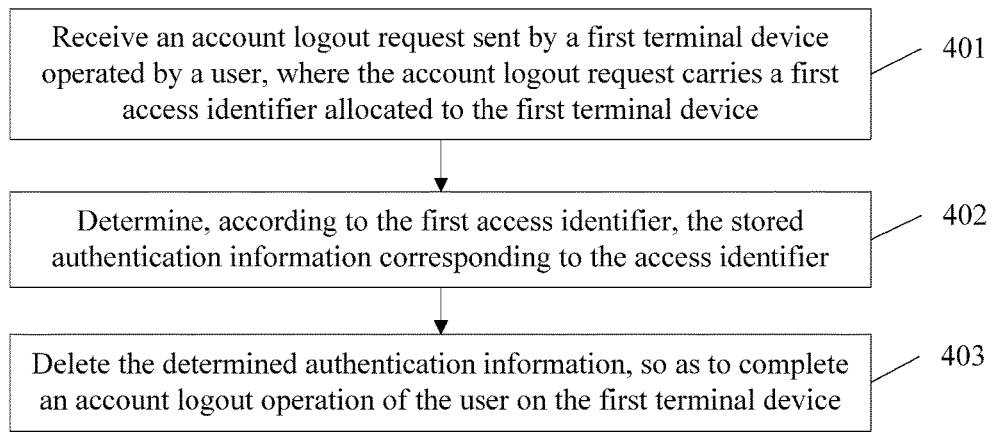
FIG. 4 is a flowchart of another account login method according to an embodiment of the present disclosure.
Figure 5:
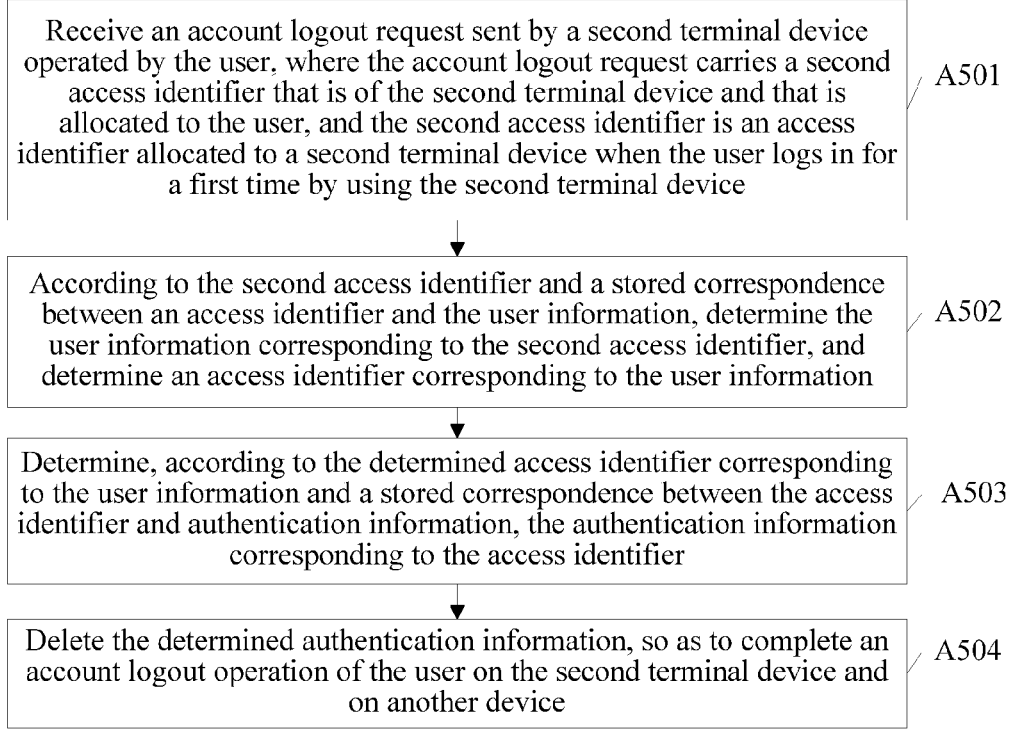
FIG. 5 is a flowchart of another account login method according to an embodiment of the present disclosure.

Further, for a user logout operation, an embodiment of the present disclosure provides two implementation manners shown in FIG. 4 and FIG. 5.

A method process shown in FIG. 4 includes:

Step 401: Receive an account logout request sent by the first terminal device operated by the user, where the account logout request carries the first access identifier allocated to the first terminal device.

Step 402: Determine, according to the first access identifier, the stored authentication information corresponding to the access identifier.

Step 403: Delete the determined authentication information, so as to complete an account logout operation of the user on the first terminal device. After the authentication information corresponding to the user is deleted, the authentication information cannot be found by using the method in FIG. 2 when the user logs in again, and a process of re-authentication is triggered.

If what is stored in the correspondence between the access identifier and the authentication information is content of the authentication information instead of an identifier of the authentication information, the authentication information may be deleted by deleting the correspondence between the access identifier in step 401 and the authentication information determined in step 402; in another implementation manner, the access identifier and the authentication information may separately have their own identifiers, and only identifier information is stored in the bipartite correspondence. In this case, only content of the authentication information determined in step 402 is deleted, and certainly, the correspondence may also be deleted because the deleted authentication information cannot be found by using a corresponding access identifier during a subsequent re-login.

It can be seen that, in this embodiment of the present disclosure, a third-party application or website may delete corresponding authentication information by determining an access identifier carried in an account logout request, so as to delete a logged-in state of a user and prevent another unauthorized user to log into the third-party application or website by using a same device and then acquires some confidential information FIG. 5 provides another account logout method, where the method is based on the method shown in FIG. 3. As shown in FIG. 5, after step 302a, the method includes:

Step A501: Receive an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device.

It should be additionally noted that the access identifier is established for a session between a terminal device and a third-party application or website. In multiple sessions between a same terminal device and a same third-party application or website, access identifier allocated to the terminal device in each session is different, and in a single session between different terminal devices and a same third-party application or website, access identifier allocated to each terminal device is also different.

Step A502: According to the second access identifier and a stored correspondence between an access identifier and the user information, determine the user information corresponding to the second access identifier, and determine an access identifier corresponding to the user information.

The access identifier corresponding to the user information includes the second access identifier, and an access identifier allocated to another device when the user logs in for the first time by using the other device other than the second terminal device.

User information of a same user is unique, and therefore what is acquired by the user according to the second access identifier and on a terminal device operated by the user is the unique user information of the user.

Step A503: Determine, according to the determined access identifier corresponding to the user information and a stored correspondence between the access identifier and authentication information, the authentication information corresponding to the access identifier.

The user logs in for a first time both on the other device (there may be one or more) and a currently operated device, and the other device and the currently operated device allocate different access identifiers to the user. Because of uniqueness of the user information, a correspondence between all these different access identifiers and the same user information is established according to step 302. Therefore, all these access identifiers may be found according to the user information.

Step A504: Delete the determined authentication information, so as to complete an account logout operation of the user on the second terminal device and on another device.

After all or some of the foregoing access identifiers are found, authentication information corresponding to these access identifiers is determined according to the correspondence that is between the access identifier and the authentication information and that is established when the user logs in for the first time, where the authentication information may be the same or may be different for different devices.

After the authentication information is found, the user may delete all authentication information, that is, logged-in states on all or some other devices that have logged in to the third-party application or service are deleted by using a local device; or the user may selectively delete some authentication information, for example, the user may select to keep a logged-in state on a local device, and delete a logged-in state on the other device.

It can be seen that, in this embodiment of the present disclosure, a third-party application or website may find all authentication information of a user by using one account logout request of the user, so that the user may delete logged-in states on all or some other devices, which is convenient for the user to perform account management.

Figure 6:
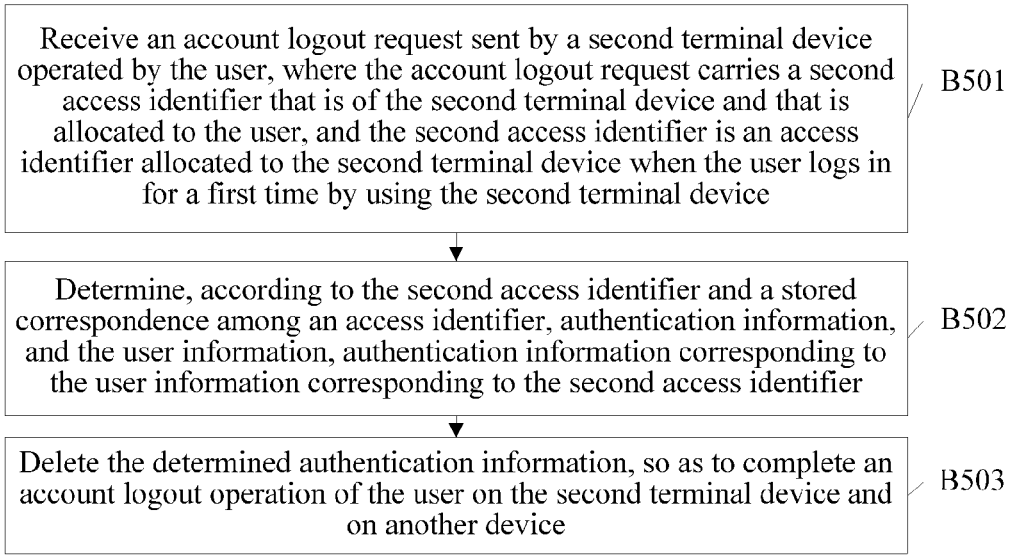
FIG. 6 is a flowchart of another account login method according to an embodiment of the present disclosure.

FIG. 6 provides another account logout method, where the method is based on the method shown in FIG. 3. As shown in FIG. 6, after step 302b, the method includes:

Step B501: Receive an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device.

Step B502: Determine, according to the second access identifier and a stored correspondence among an access identifier, authentication information, and the user information, authentication information corresponding to the user information corresponding to the second access identifier.

Step B503: Delete the determined authentication information, so as to complete an account logout operation of the user on the second terminal device and on another device.

Compared with the method process shown in step A501 to step A504, the method process shown in step B501 to step B503 is more simple to operate, because the stored correspondence herein is a correspondence among the first access identifier allocated to the first terminal device, the authentication information corresponding to the first access identifier, and the user information, and this is a tripartite correspondence, but the method process shown in A501 to A504 uses a bipartite correspondence.

Figure 7:
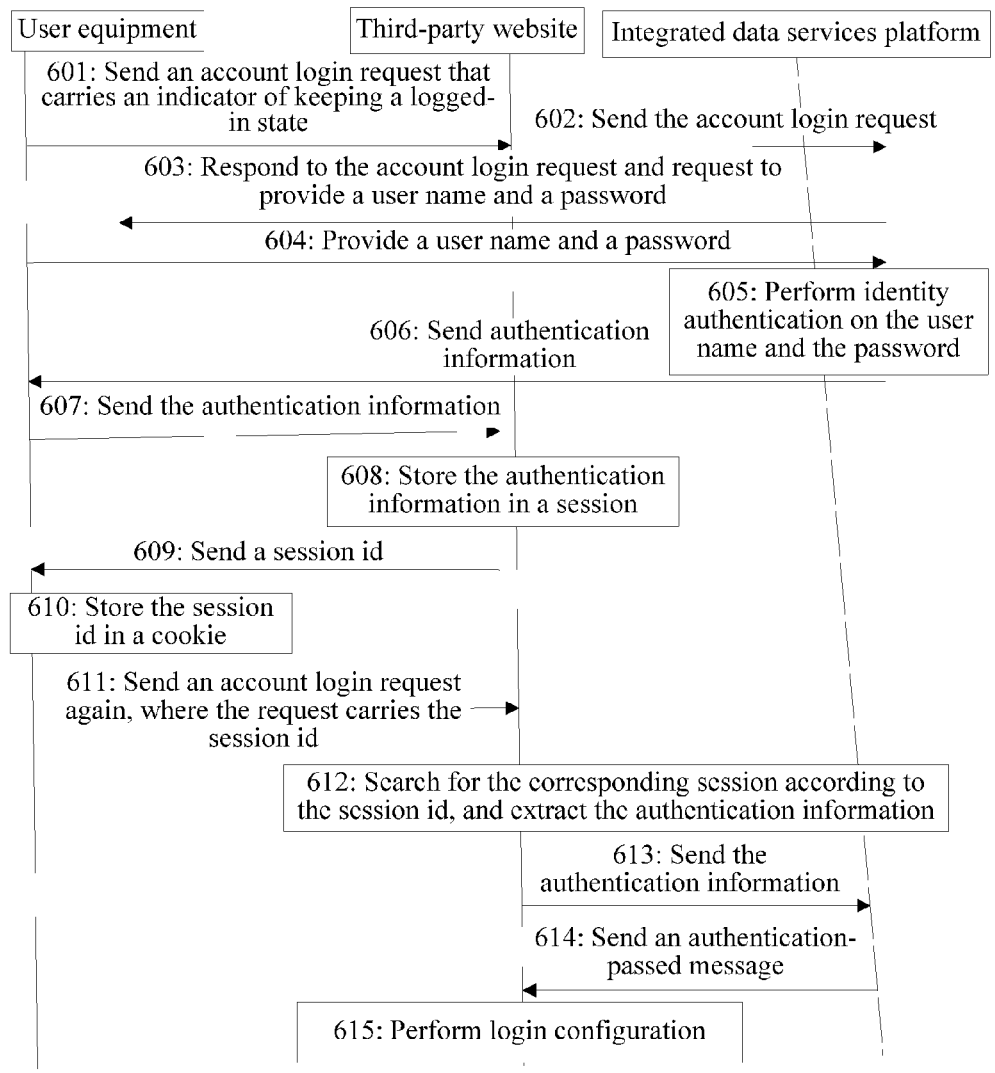
FIG. 7 is a flowchart of another account login method according to an embodiment of the present disclosure.

Based on the foregoing descriptions, with reference to process interaction among a user equipment, a third-party website, and an integrated data services platform, an embodiment of the present disclosure describes an account login method provided in the present disclosure. Refer to FIG. 7, the method includes:

Step 601: A user selects to use the integrated data services platform to log in to the third-party website, and sends an account login request to the third-party website by using the user equipment, and requests to record a logged-in state, that is, the account login request carries an indicator of keeping a logged-in state.

Step 602. The third-party website determines that the user logs in for a first time, and sends the account login request to the integrated data services platform.

For example, if what is sent by the user is the account login request, it is determined that the user logs in for the first time; if a request sent by the user is page access URL information, that is, a service access request, and the request includes an access identifier, it is determined that the user logs in for not a first time.

Step 603: The integrated data services platform responds to the account login request of the user, so as to request the user to provide a user name and a password required for authentication.

Step 604: The user provides a user name and a password for the integrated data services platform.

Step 605: The integrated data services platform performs identity authentication on the user name and the password provided by the user.

Step 606: The integrated data services platform sends authentication information to the user after determining that an identity of the user is valid.

Step 607: The user sends the received authentication information to the third-party website.

Step 608: The third-party website stores the authentication information, sent by the user, in a session of current access because the user requests to record the logged-in state.

Step 609: The third-party website sends a generated session id to the user.

Step 610: The user stores the session id in a cookie.

Step 611: The user sends an account login request to the third-party website again, where the account login request carries the session id that is stored during the previous login.

Step 612: The third-party website searches for the corresponding session according to the session id, and extracts the authentication information in the session.

Step 613: The third-party website directly performs, to the integrated data services platform and according the extracted authentication information, identity authentication.

Step 614: The integrated data services platform sends an authentication-passed message to the third-party website after determining that the user identity is valid.

Step 615: The third-party website performs login setting for the user.

It can be seen that, according to the account login method provided in this embodiment of the present disclosure, whether a user decides to keep a logged-in state is determined by detecting whether an account login request of the user carries an indicator of keeping a logged-in state, and authentication information allocated by an integrated data services platform to the user is stored when the user determines that a logged-in state on a third-party application or website needs to be kept; therefore, in a subsequent login process of the user, the third-party application or website may use the authentication information of the user to automatically initiate an authentication request to the integrated data services platform for the user to log in to the third-party application or website. Compared with the prior art in which a logged-in state of a user is directly kept without inquiring the user, a possibility that an account identity of the user is fraudulently used can be effectively reduced, and user account login security is provided.

Figure 8:
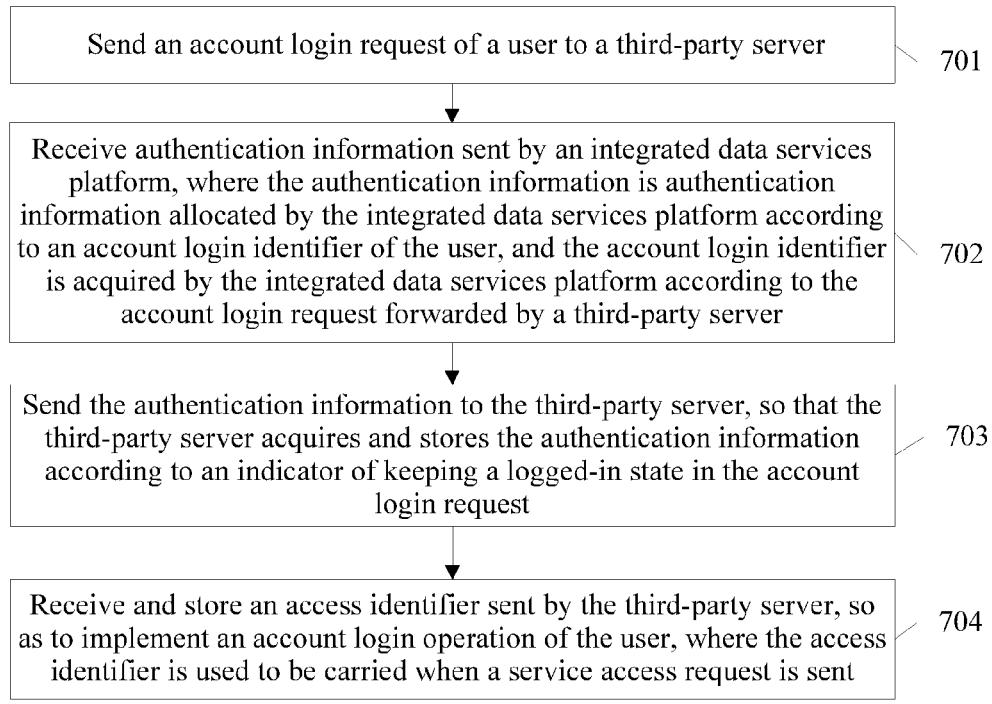
FIG. 8 is a flowchart of another account login method according to an embodiment of the present disclosure.

In a perspective of a user equipment, an embodiment of the present disclosure provides an account login method shown in FIG. 8, where the method includes:

Step 701: Send an account login request of a user to a third-party server.

The account login request is used to instruct to use an account authentication process of an integrated data services platform, and the account login request carries an indicator of keeping a logged-in state.

Step 702: Receive authentication information sent by the integrated data services platform, where the authentication information is authentication information allocated by the integrated data services platform according to an account login identifier of the user, and the account login identifier is acquired by the integrated data services platform according to the account login request forwarded by the third-party server.

Step 703: Send the authentication information to the third-party server, so that the third-party server acquires and stores the authentication information according to an indicator of keeping a logged-in state in the account login request.

Step 704: Receive and store an access identifier sent by the third-party server, so as to implement an account login operation of the user, where the access identifier is used to be carried when a service access request is sent.

It can be seen that, in the account login method provided in this embodiment of the present disclosure, a user equipment may be enabled to independently select whether to keep a logged-in state when a user logs in to a third-party application or service by using an authentication process of an integrated data services platform, which effectively reduces a possibility that an account identity of the user is fraudulently used and provides user account login security.

Figure 9:
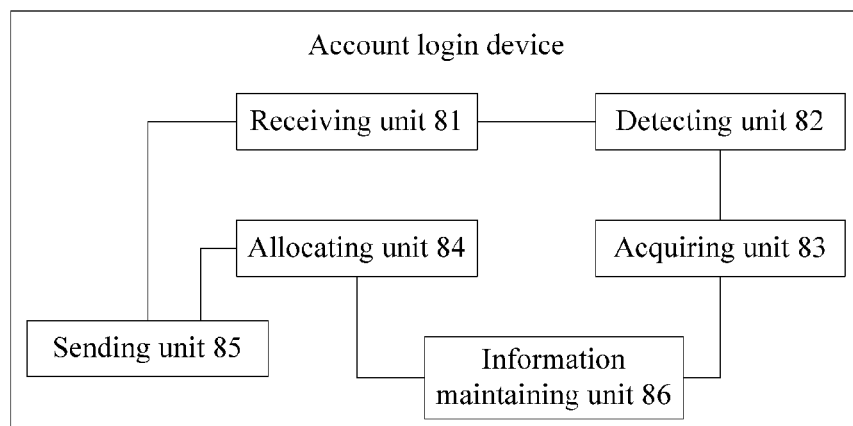
FIG. 9 is a schematic structural diagram of an account login device according to an embodiment of the present disclosure.

An embodiment of the present disclosure further provides an account login device, which is configured to implement the processing process of the third-party application or website shown in any one of FIG. 1 to FIG. 7, and the account login device may be applied in a third-party application or website server. As shown in FIG. 9, the account login device includes: a receiving unit 81, configured to receive an account login request sent by a first terminal device operated by a user, and send the account login request to an integrated data services platform, where the account login request is used to instruct to use an account authentication process of the integrated data services platform; a detecting unit 82, configured to detect whether the account login request received by the receiving unit 81 carries an indicator of keeping a logged-in state; an acquiring unit 83, configured to acquire and store authentication information of the first terminal device when the detecting unit 82 detects that the account login request carries the indicator of keeping a logged-in state, where the authentication information is authentication information allocated to the first terminal device by the integrated data services platform according to an account login identifier of the user, and the account login identifier is acquired by the integrated data services platform according to the account login request; an allocating unit 84, configured to allocate a first access identifier to the first terminal device; a sending unit 85, configured to send, to the first terminal device, the first access identifier allocated by the allocating unit 84, so that the first access identifier is carried in a service access request sent by the first terminal device; and an information maintaining unit 86, configured to establish and store a correspondence between the first access identifier allocated by the allocating unit 84 to the first terminal device and the authentication information allocated by the integrated data services platform to the first terminal device, so as to keep a logged-in state of the user on the first terminal device, and complete an account login operation of the user on the first terminal device.

Figure 10:
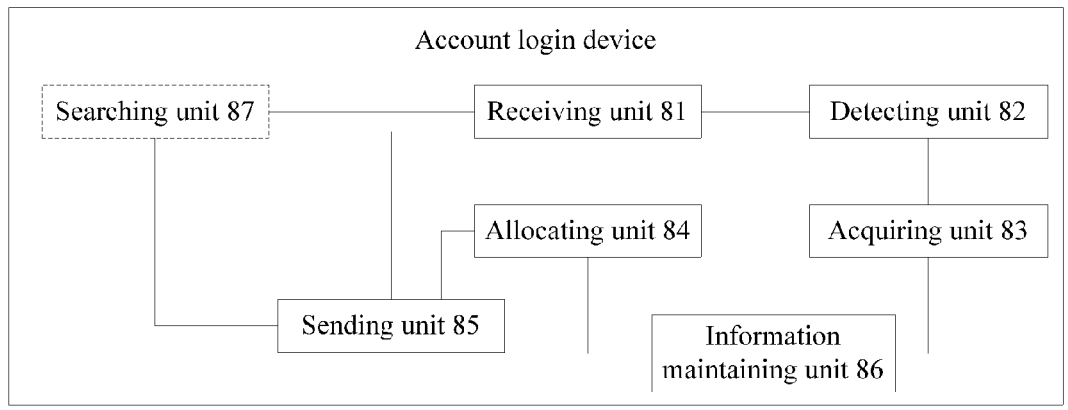
FIG. 10 is a schematic structural diagram of another account login device according to an embodiment of the present disclosure.

According to the foregoing method embodiments, as shown in FIG. 10, the device may further include a searching unit 87.

The receiving unit 81 is further configured to receive the service access request sent by the first terminal device operated by the user, where the service access request carries the first access identifier allocated to the first terminal device.

The searching unit 87 is configured to search, according to the first access identifier received by the receiving unit 81, the stored authentication information corresponding to the first access identifier.

The sending unit 84 is configured to send the stored authentication information to the integrated data services platform when the searching unit 87 finds the stored authentication information corresponding to the first access identifier, so that the integrated data services platform determines whether the authentication information is valid.

The information maintaining unit 86 is further configured to configure service access information for the user when a message indicating that the integrated data services platform determines that the authentication information is valid is received.

Figure 11:
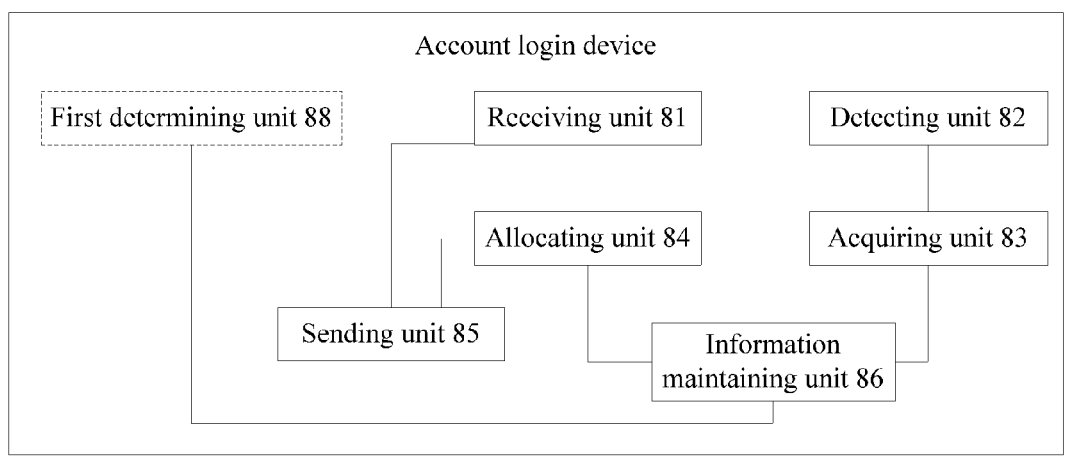
FIG. 11 is a schematic structural diagram of another account login device according to an embodiment of the present disclosure.

In an implementation manner, as shown in FIG. 11, the device may further include a first determining unit 88.

The receiving unit 81 is further configured to receive an account logout request sent by the first terminal device operated by the user, where the account logout request carries the first access identifier allocated to the first terminal device.

The first determining unit 88 is configured to determine, according to the first access identifier received by the receiving unit 81, the stored authentication information corresponding to the access identifier.

The information maintaining unit 86 is further configured to delete the authentication information determined by the first determining unit 88, so as to complete an account logout operation of the user on the first terminal device.

In another implementation manner, the acquiring unit 83 is further configured to acquire user information of the user, where the user information is in a one-to-one correspondence with the user.

The information maintaining unit 76 is further configured to establish and store a correspondence between the first access identifier allocated to the first terminal device and the user information.

Figure 12:
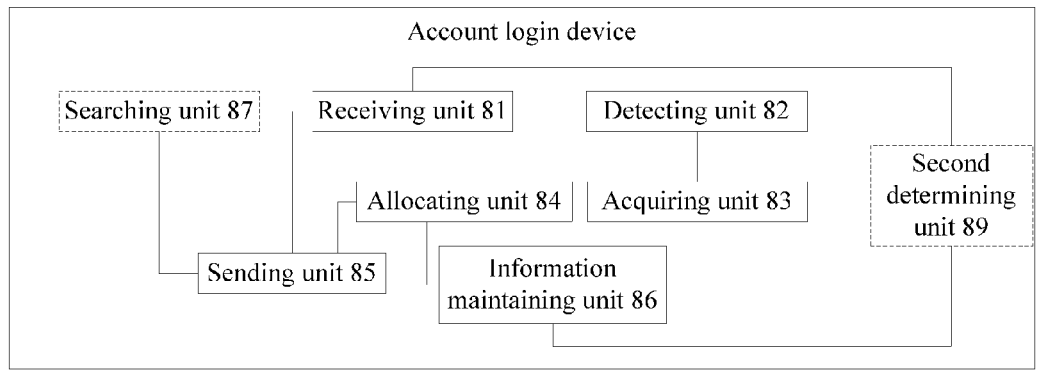
FIG. 12 is a schematic structural diagram of another account login device according to an embodiment of the present disclosure.

In this implementation manner, as shown in FIG. 12, the device may further include a second determining unit 89.

The receiving unit 81 is further configured to receive an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device.

The second determining unit 89 is configured to: according to the second access identifier and a stored correspondence between an access identifier and the user information, determine the user information corresponding to the second access identifier, and determine an access identifier corresponding to the user information, where the access identifier corresponding to the user information includes the second access identifier, and an access identifier allocated to another device when the user logs in for a first time by using the other device other than the second terminal device; and determine, according to the determined access identifier corresponding to the user information and a stored correspondence between the access identifier and authentication information, the authentication information corresponding to the access identifier.

The information maintaining unit 86 is further configured to delete the authentication information determined by the second determining unit 89, so as to complete an account logout operation of the user on the second terminal device.

In another implementation manner, the acquiring unit 83 is further configured to acquire user information of the user, where the user information is in a one-to-one correspondence with the user.

The information maintaining unit 86 is configured to establish and store a correspondence among the first access identifier allocated to the first terminal device, the authentication information corresponding to the first access identifier, and the user information acquired by the acquiring unit 83.

Figure 13:
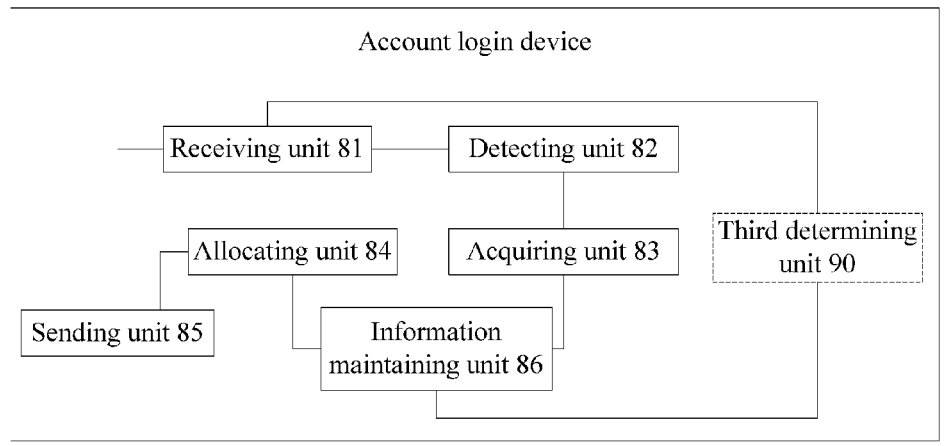
FIG. 13 is a schematic structural diagram of another account login device according to an embodiment of the present disclosure.

In this implementation manner, as shown in FIG. 13, the device may further include a third determining unit 90.

The receiving unit 81 is configured to receive an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device.

The third determining unit 90 is configured to, determine, according to the second access identifier received by the receiving unit 81 and a stored correspondence among an access identifier, authentication information, and the user information, authentication information corresponding to the user information corresponding to the second access identifier.

The information maintaining unit 86 is configured to delete the authentication information determined by the third determining unit 90, so as to complete an account logout operation of the user on the second terminal device and on another device.

In addition, based on any device shown in FIG. 9 to FIG. 13, the sending unit 84 is further configured to forward re-login request to the integrated data services platform when the searching unit 88 does not find the stored authentication information corresponding to the access identifier, so that the integrated data services platform acquires the account login identifier of the user according to the re-login request, and allocates authentication information to the first terminal device according to the account login identifier.

The information maintaining unit 86 is further configured to perform account login configuration for the user.

It can be seen that, according to the account login device provided in this embodiment of the present disclosure, whether a user decides to keep a logged-in state is determined by detecting whether an account login request of the user carries an indicator of keeping a logged-in state, and authentication information allocated by an integrated data services platform to the user is stored when the user determines that a logged-in state on a third-party application or website needs to be kept; therefore, in a subsequent login process of the user, the third-party application or website may use the authentication information of the user to automatically perform initiate an authentication request to the integrated data services platform for the user to log in to the third-party application or website. Compared with the prior art in which a logged-in state of a user is directly kept without inquiring the user, a possibility that an account identity of the user is fraudulently used can be effectively reduced, and user account login security is provided.

Figure 14:
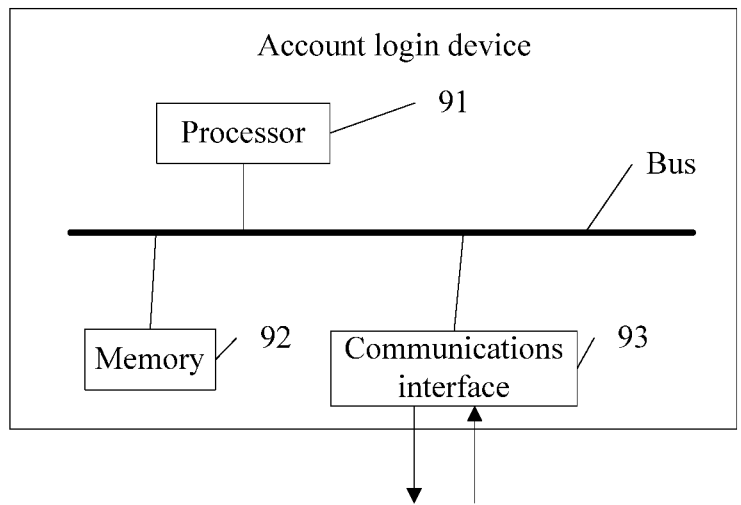
FIG. 14 is a schematic structural diagram of another account login device according to an embodiment of the present disclosure.

An embodiment of the present disclosure further provides an account login device. As shown in FIG. 14, the device includes a processor 91, a memory 92, and a communications interface 93. The memory 92 stores program code, and the processor 91 may invoke the program code stored in the memory 92 to implement the method process shown in any of the foregoing method embodiments. The processor 91, the memory 92, and the communications interface 93 may communicate by using a bus.

The processor 91 invokes the program data stored in the memory 92 to: receive, by using the communications interface 93, an account login request sent by a first terminal device operated by a user, and send the account login request to an integrated data services platform by using the communications interface 93, where the account login request is used to instruct to use an account authentication process of the integrated data services platform; detect whether the account login request carries an indicator of keeping a logged-in state; acquire and store authentication information of the first terminal device when it is detected that the account login request carries the indicator of keeping a logged-in state, where the authentication information is authentication information allocated to the first terminal device by the integrated data services platform according to an account login identifier of the user, and the account login identifier is acquired by the integrated data services platform according to the account login request; allocate a first access identifier to the first terminal device, and send the first access identifier to the first terminal device, so that the first access identifier is carried in a service access request sent by the first terminal device; and establish and store a correspondence between the first access identifier allocated to the first terminal device and the authentication information allocated by the integrated data services platform to the first terminal device, so as to keep a logged-in state of the user on the first terminal device, and complete an account login operation of the user on the first terminal device.

The communications interface 93 is configured to send or receive data according to an instruction of the processor 91. In the following embodiment, data exchange between the processor 91 and another device other than the device, such as an integrated data services platform or a user equipment, is performed by using the communications interface 93, and details are not described herein again.

The memory 92 may be further configured to store the authentication information of the user and data information generated in a method process such as the method process of establishing and storing the correspondence between the access identifier allocated to the user and the authentication information allocated by the integrated data services platform to the user.

Further, the processor 91 is further configured to receive, by using the communications interface 93, the service access request sent by the first terminal device operated by the user, where the service access request carries the first access identifier allocated to the first terminal device; search, according to the first access identifier, for the stored authentication information corresponding to the first access identifier; send the stored authentication information to the integrated data services platform when the stored authentication information corresponding to the first access identifier is found, so that the integrated data services platform determines whether the authentication information is valid; and configure service access information for the user when a message indicating that the integrated data services platform determines that the authentication information is valid is received.

In an implementation manner, the processor 91 is further configured to receive, by using the communications interface 93, an account logout request sent by the first terminal device operated by the user, where the account logout request carries the first access identifier allocated to the first terminal device; determine, according to the first access identifier, the stored authentication information corresponding to the access identifier; and delete the determined authentication information, so as to complete an account logout operation of the user on the first terminal device.

In another implementation manner, the processor 91 is configured to acquire user information of the user, where the user information is in a one-to-one correspondence with the user; and establish and store a correspondence between the first access identifier allocated by the first terminal device and the user information. All data such as the correspondence and the user information may be stored in the memory 92.

In this implementation manner, to delete, on one user equipment, user logged-in states on multiple devices, the processor 91 may be further configured to: receive an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device; according to the second access identifier and a stored correspondence between an access identifier and the user information, determine the user information corresponding to the second access identifier, and determine an access identifier corresponding to the user information, where the access identifier corresponding to the user information includes the second access identifier, and an access identifier allocated to another device when the user logs in for a first time by using the other device other than the second terminal device; determine, according to the determined access identifier corresponding to the user information and a stored correspondence between the access identifier and authentication information, the authentication information corresponding to the access identifier; and delete the determined authentication information, so as to complete an account logout operation of the user on the second terminal device and on the other device.

In another implementation manner, the processor 91 is configured to acquire user information of the user, where the user information is in a one-to-one correspondence with the user; and establish and store a correspondence among the first access identifier allocated to the first terminal device, the authentication information corresponding to the first access identifier, and the user information.

In this implementation manner, the processor 91 is further configured to receive, by using the communications interface 93, an account logout request sent by a second terminal device operated by the user, where the account logout request carries a second access identifier that is of the second terminal device and that is allocated to the user, and the second access identifier is an access identifier allocated to the second terminal device when the user logs in for a first time by using the second terminal device; determine, according to the second access identifier and a stored correspondence among an access identifier, authentication information, and the user information, authentication information corresponding to the user information corresponding to the second access identifier; and delete the determined authentication information, so as to complete an account logout operation of the user on the second terminal device and on another device.

Optionally, the processor 91 is further configured to forward a re-login request to the integrated data services platform when the stored authentication information corresponding to the first access identifier is not found, so that the integrated data services platform acquires the account login identifier of the user according to the re-login request, and allocates authentication information to the first terminal device according to the account login identifier; and perform account login configuration for the user after the authentication information is acquired.

It can be seen that, according to the account login device provided in this embodiment of the present disclosure, whether a user decides to keep a logged-in state is determined by detecting whether an account login request of the user carries an indicator of keeping a logged-in state, and authentication information allocated by an integrated data services platform to the user is stored when the user determines that a logged-in state on a third-party application or website needs to be kept; therefore, in a subsequent login process of the user, the third-party application or website may use the authentication information of the user to automatically perform authentication login to the integrated data services platform. Compared with the prior art in which a logged-in state of a user is directly kept without inquiring the user, a possibility that an account identity of the user is fraudulently used can be effectively reduced, and user account login security is provided.

Figure 15:
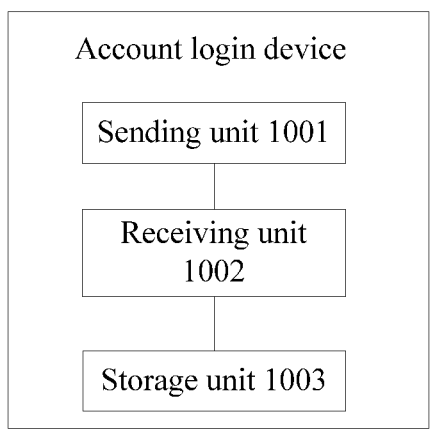
FIG. 15 is a schematic structural diagram of another account login device according to an embodiment of the present disclosure.

An embodiment of the present disclosure further provides an account login device, where the device may be applied to a user equipment, and the user equipment may be a mobile phone, a desktop computer, a notebook, a personal digital assistant, and the like. As shown in FIG. 15, the device includes: a sending unit 1001, configured to send an account login request of a user to a third-party server, where the account login request is used to instruct to use an account authentication process of an integrated data services platform, and the account login request carries an indicator of keeping a logged-in state; a receiving unit 1002, configured to receive authentication information sent by the integrated data services platform, where the authentication information is authentication information allocated by the integrated data services platform according to an account login identifier of the user, and the account login identifier is acquired by the integrated data services platform according to the account login request forwarded by the third-party server, where the sending unit 1001 is further configured to send, to the third-party server, the authentication information received by the receiving unit 1002, so that the third-party server acquires and stores the authentication information according to the indicator of keeping a logged-in state in the account login request; and the receiving unit 1002 is further configured to receive an access identifier sent by the third-party server; and a storage unit 1003, configured to store the access identifier that is sent by the third-party server and that is received by the receiving unit, so as to implement an account login operation of the user, where the access identifier is used to be carried when a service access request is sent.

Figure 16:
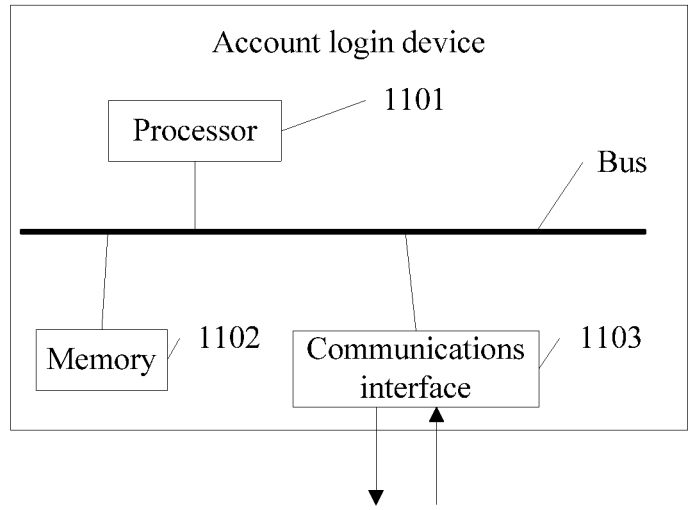
FIG. 16 is a schematic structural diagram of another account login device according to an embodiment of the present disclosure.
Figure 17:
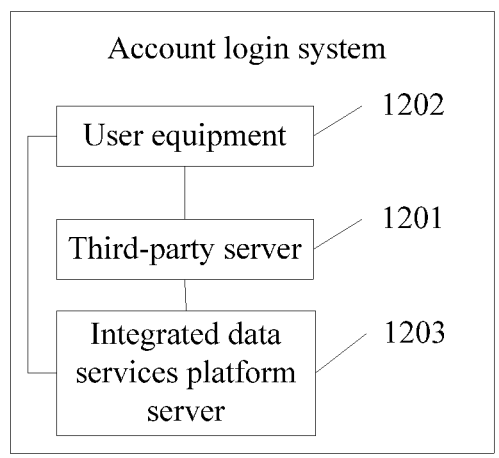
FIG. 17 is a schematic structural diagram of an account login system according to an embodiment of the present disclosure.

An embodiment of the present disclosure further provides another account login device that can be applied to a user equipment. As shown in FIG. 16, the device includes: a processor 1101, a memory 1102, and a communications interface 1103. The memory 1102 stores program code, and the processor 1101 may invoke the program code stored in the memory 1102 to implement the method process shown in any of the foregoing method embodiments. The processor 1101, the memory 1102, and the communications interface 1103 may communicate by using a bus.

The processor 1101 may invoke an application program in the memory 1102 to execute the following instructions: sending an account login request of a user to a third-party server, where the account login request is used to instruct to use an account authentication process of an integrated data services platform, and the account login request carries an indicator of keeping a logged-in state; receiving authentication information sent by the integrated data services platform, where the authentication information is authentication information allocated by the integrated data services platform according to an account login identifier of the user, and the account login identifier is acquired by the integrated data services platform according to the account login request forwarded by the third-party server, where the sending instruction further for sending the authentication information to the third-party server, so that the third-party server acquires and stores the authentication information according to the indicator of keeping a logged-in state in the account login request; and the receiving instruction further for receiving an access identifier sent by the third-party server.

The memory 1102 is configured to store the access identifier sent by the third-party server, so as to implement an account login operation of the user, where the access identifier is used to be carried when a service access request is sent.

It can be seen that, in the account login device provided in this embodiment of the present disclosure, a user equipment may be enabled to independently select whether to keep a logged-in state when a user logs in to a third-party application or service by using an authentication process of an integrated data services platform, which effectively reduces a possibility that an account identity of the user is fraudulently used and provides user account login security.

An embodiment of the present disclosure further provides an account login system. As shown in FIG. 16, the system includes a third-party server 1001, a user equipment 1002, and an integrated data services platform server 1003.

The user equipment 1002 is configured to send an account login request of a user to the third-party server 1001, where the account login request instructs to use an account authentication process of the integrated data services platform.

The third-party server 1001 is configured to receive the account login request sent by the user equipment 1002, and send the account login request to the integrated data services platform, where the account login request is used to instruct to use the account authentication process of the integrated data services platform; detect whether the account login request carries an indicator of keeping a logged-in state; when it is detected that the account login request carries the indicator of keeping a logged-in state, acquire and store authentication information of the user equipment 1002, where the authentication information is authentication information allocated to the user equipment 1002 by the integrated data services platform according to an account login identifier of the user, and the account login identifier is acquired by the integrated data services platform according to the account login request; allocate a first access identifier to the user equipment 1002, and send the first access identifier to the user equipment 1002, so that the first access identifier is carried in a service access request sent by the user equipment 1002; and establish and store a correspondence between the first access identifier allocated to the user equipment 1002 and the authentication information allocated by the integrated data services platform to the user equipment 1002, so as to keep a logged-in state of the user on the user equipment 1002, and complete an account login operation of the user on the user equipment 1002.

The integrated data services platform server 1003 is configured to receive the account login request forwarded by the third-party server 1001; acquire the account login identifier of the user according to the account login request; allocate the authentication information to the user according to the account login identifier; and send the authentication information to the user equipment 1002.

It should be noted that, for details about module division and specific implementation methods of all devices in the account login system provided in this embodiment of the present disclosure, reference may be made to the descriptions in the foregoing apparatus and method embodiments, and details are not described herein again.

In conclusion, according to the account login device and system provided in this embodiment of the present disclosure, whether a user decides to keep a logged-in state is determined by detecting whether an account login request of the user carries an indicator of keeping a logged-in state, and authentication information allocated by an integrated data services platform to the user is stored when the user determines that a logged-in state on a third-party application or website needs to be kept; therefore, in a subsequent login process of the user, the third-party application or website may use the authentication information of the user to automatically perform authentication login to the integrated data services platform. Compared with the prior art in which a logged-in state of a user is directly kept without inquiring the user, a possibility that an account identity of the user is fraudulently used can be effectively reduced, and user account login security is provided.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. A person of ordinary skill in the art may understand and implement the embodiments of the present disclosure without creative efforts.

Based on the foregoing descriptions of the embodiments, a person skilled in the art may clearly understand that the present disclosure may be implemented by software in addition to necessary universal hardware or by dedicated hardware only, including a dedicated integrated circuit, a dedicated central processing unit (CPU), a dedicated memory, a dedicated component and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The software product is stored in a readable storage medium, such as a floppy disk, a universal serial bus (USB) flash drive, a removable hard disk, a read-only memory (ROM), a random-access memory (RAM), a magnetic disk, or an optical disc of a computer, and includes several instructions for instructing a computer device (which may be a personal computer, a server, a network device, and the like) to perform the methods described in the embodiments of the present disclosure.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An account login method implemented by a third-party server, comprising:
   receiving an account login request from a first terminal device;
   sending the account login request to an integrated data services platform, wherein the account login request for logging in the third-party server comprises instructions that instruct an authentication process to use an account of the integrated data services platform;
   detecting whether the account login request comprises an indicator for keeping a logged-in state;
   receiving first authentication information of the first terminal device when detecting that the account login request carries the indicator for keeping the logged-in state, wherein the first authentication information is allocated to the first terminal device according to an account login identifier of a user, and wherein the account login identifier is determined according to the account login request;
   sending a first access identifier to the first terminal device, wherein the first access identifier enables the first terminal device to send a service access request with the first access identifier;
   establishing a first correspondence between the first access identifier allocated to the first terminal device and the first authentication information; and
   storing the first correspondence for permitting the service access request of the first terminal device according to the first access identifier.

2. The method according to claim 1, further comprising:
   receiving the service access request from the first terminal device, wherein the service access request carries the first access identifier allocated to the first terminal device;
   searching, according to the first access identifier and the first correspondence, for the first authentication information corresponding to the first access identifier;
   sending the authentication information to the integrated data services platform when the first authentication information corresponding to the first access identifier is found to request the integrated data services platform to determine whether the first authentication information is valid;
   receiving a message indicating that the integrated data services platform determines that the first authentication information is valid; and
   configuring service access information for the user when the message is received.

3. The method according to claim 1, further comprising:
   receiving an account logout request from the first terminal device, wherein the account logout request comprises the first access identifier allocated to the first terminal device;

determining, according to the first access identifier and the first correspondence, the first authentication information corresponding to the first access identifier; and deleting the first authentication information corresponding to the first access identifier to complete an account logout operation of the user on the first terminal device.

4. The method according to claim 1, further comprising:

acquiring user information of the user, wherein the user information comprises a one-to-one correspondence with the user;

establishing a second correspondence between the first access identifier allocated to the first terminal device and the user information; and storing the second correspondence.

5. The method according to claim 1, further comprising:

acquiring user information of the user, wherein the user information comprises a one-to-one correspondence with the user;

establishing a second correspondence among the first access identifier allocated to the first terminal device, the first authentication information corresponding to the first access identifier, and the user information; and storing the second correspondence.

6. The method according to claim 4, further comprising:

receiving an account logout request from a second terminal device, wherein the account logout request comprises a second access identifier allocated to the second terminal device, and wherein the second access identifier is allocated to the second terminal device when the user logs in the third-party server for a first time by using the second terminal device;

determining that the second access identifier corresponds to a third access identifier in a second stored correspondence between the third access identifier and the user information, wherein the third access identifier comprises the second access identifier and a fourth access identifier allocated to another device when the user logs in the third party server for a first time by using the other device other than the second terminal device;

determining, according to the determined third access identifier corresponding to the user information and a third stored correspondence between the third access identifier and second authentication information, the second authentication information corresponding to the third access identifier; and deleting the determined second authentication information to complete an account logout operation of the user on the second terminal device and on the other device.

7. The method according to claim 5, further comprising:

receiving an account logout request from a second terminal device operated by the user, wherein the account logout request comprises a second access identifier of the second terminal device, and wherein the second access identifier is an access identifier allocated to the user on the second terminal device when the user logs in the third-party server for a first time by using the second terminal device;

determining, according to the second access identifier and a third stored correspondence among a third access identifier, second authentication information and the user information, wherein the second authentication information corresponding to the user information corresponds to the second access identifier; and deleting the second authentication information to complete an account logout operation of the user on the second terminal device and on another device.

8. The method according to claim 2, further comprising:

forwarding a re-login request to the integrated data services platform when the authentication information corresponding to the first access identifier is not found to request the integrated data services platform to acquire the account login identifier of the user according to the re-login request and allocate authentication information to the first terminal device according to a re-login identifier; and performing account login configuration for the user after the authentication information is acquired.

9. An account login method implemented by a first terminal device, wherein the method comprises:

sending an account login request to a third-party server, wherein the account login request for logging in the third-party server comprises instructions that instruct an authentication process to use an account of an integrated data services platform, and wherein the account login request comprises an indicator for keeping a logged-in state;

receiving authentication information from the integrated data services platform, wherein the authentication information is allocated by the integrated data services platform according to an account login identifier of a user, and wherein the account login identifier is acquired according to the account login request from the third-party server;

sending the authentication information to the third-party server to request the third-party server to acquire and store the authentication information according to the indicator for keeping a logged-in state in the account login request; and receiving an access identifier from the third-party server;

storing the access identifier for implementing an account login operation; and, sending a service request carrying the access identifier.

10. An account login device, comprising:

a memory configured to store an application program comprising instructions; and a communications interface;

a bus; and a processor, wherein the processor, the memory, and the communications interface communicate by using the bus, and wherein the instructions cause the processor to be configured to:

receive an account login request from a first terminal device;

send the account login request to an integrated data services platform, wherein the account login request to log in a third-party server comprises instructions that instruct an authentication process to use an account of the integrated data services platform;

detect whether the account login request comprises an indicator for keeping a logged-in state;

receive first authentication information of the first terminal device when detecting that the account login request comprises the indicator for keeping the logged-in state, wherein the first authentication information is allocated to the first terminal device according to an account login identifier of a user, and wherein the account login identifier is determined according to the account login request;

send a first access identifier to the first terminal device to enable the first terminal device to send a service access request with the first access identifier;

establish a first correspondence between the first access identifier allocated to the first terminal device and the authentication information allocated by the integrated data services platform to the first terminal device; and store the first correspondence for permitting the service access request of the first terminal device according to the first access identifier.

11. The device according to claim 10, wherein the instructions further cause the processor to be configured to:
receive the service access request from the first terminal device, wherein the service access request comprises the first access identifier allocated to the first terminal device;
search, according to the first access identifier and the first correspondence, for the first authentication information corresponding to the first access identifier;
send the authentication information to the integrated data services platform when the first authentication information corresponding to the first access identifier is found to request the integrated data services platform to determine whether the first authentication information is valid;
receive a message indicating that the integrated data services platform determined that the first authentication information is valid; and
configure service access information for the user when the message is received.

12. The device according to claim 10, where the instructions further cause the processor to be configured to:
receive an account logout request from the first terminal device, wherein the account logout request comprises the first access identifier allocated to the first terminal device;
determine, according to the first access identifier and the first correspondence, the first authentication information corresponding to the first access identifier; and
delete the first authentication information corresponding to the first access identifier to complete an account logout operation of the user on the first terminal device.

13. The device according to claim 10, where the instructions further cause the processor to be configured to:
acquire user information of the user, wherein the user information is in a one-to-one correspondence with the user;
establish a second correspondence between the first access identifier allocated to the first terminal device and the user information; and
store the second correspondence.

14. The device according to claim 10, wherein the instructions further cause the processor to be configured to execute the application program to:
acquire user information of the user, wherein the user information comprises a one-to-one correspondence with the user;
establish a second correspondence among the first access identifier allocated to the first terminal device, the authentication information corresponding to the first access identifier, and the user information; and
store the second correspondence.

15. The device according to claim 13, wherein the instructions further cause the processor to be configured to execute the application program to:
receive an account logout request from a second terminal device, wherein the account logout request comprises a second access identifier allocated to the second terminal device, and wherein the second access identifier is allocated to the second terminal device when the user logs in the third-party server for a first time by using the second terminal device;
determine that the second access identifier corresponds to a third access identifier in a second stored correspondence between the third access identifier and the user information, wherein the third access identifier comprises the second access identifier and a fourth access identifier allocated to another device when the user logs in the third party server for a first time by using the other device other than the second terminal device;
determine, according to the determined third access identifier corresponding to the user information and a third stored correspondence between the third access identifier and second authentication information, the second authentication information corresponding to the third access identifier; and
delete the determined second authentication information to complete an account logout operation of the user on the second terminal device and on the other device.

16. The device according to claim 14, wherein the instructions further cause the processor to be configured to execute the application program to:
receive an account logout request from a second terminal device operated by the user, wherein the account logout request comprises a second access identifier of the second terminal device, and wherein the second access identifier is an access identifier allocated to the user on the second terminal device when the user logs in the third-party server for a first time by using the second terminal device;
determine, according to the second access identifier and a third stored correspondence among a third access identifier, second authentication information and the user information, wherein the second authentication information corresponding to the user information corresponds to the second access identifier; and
delete the second authentication information to complete an account logout operation of the user on the second terminal device and on another device.

17. The device according to claim 11, wherein the instructions further cause the processor to be configured to execute the application program to:
forward a re-login request to the integrated data services platform when the authentication information corresponding to the first access identifier is not found to request the integrated data services platform to acquire the account login identifier of the user according to the re-login request and allocate authentication information to the first terminal device according to a re-login identifier; and
perform account login configuration for the user after the authentication information is acquired.

18. An account login device, comprising:
a memory configured to store an application program comprising instructions;
a communications interface;
a bus; and
a processor, wherein the processor, the memory, and the communications interface communicate by using the bus, and wherein the instructions cause the processor to be configured to:
send an account login request to a third-party server, wherein the account login request for logging in the third-party server comprises instructions that instruct an authentication process to use an account of an integrated data services platform, and wherein the account login request comprises an indicator for keeping a logged-in state;

receive authentication information from the integrated data services platform, wherein the authentication information is allocated by the integrated data services platform according to an account login identifier of a user, and wherein the account login identifier is acquired according to the account login request from the third-party server;

send the authentication information to the third-party server to enable the third-party server to acquire and store the authentication information according to the indicator for keeping the logged-in state in the account login request;

receive an access identifier from the third-party server, wherein the access identifier enables the account login device to implement an account login operation; and send a service access request carrying the access identifier.

* * * * *